E. G. GODFREE & F. R. WHITELAW.
ADJUSTABLE WATER SPRINKLER OR SPRAYER.
APPLICATION FILED MAR. 13, 1911.
1,034,613.
Patented Aug. 6, 1912.
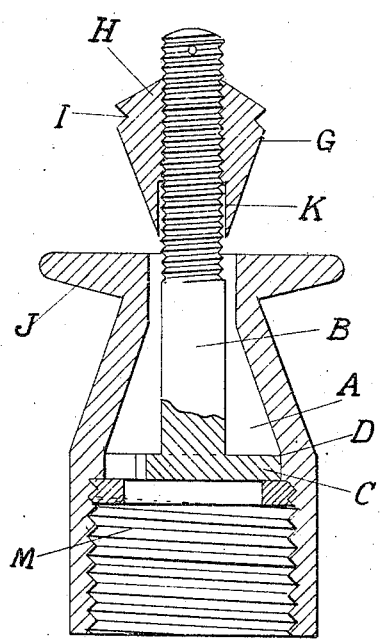
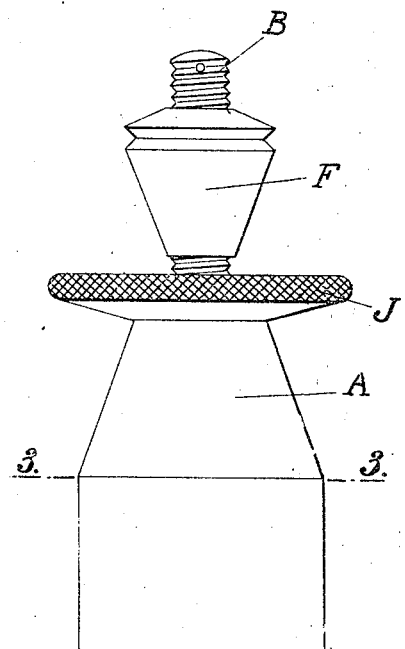
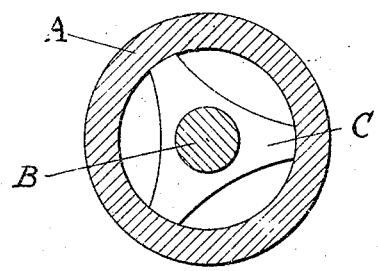
Witnesses:
F. C. Schroder
A. Reynolds
Inventor:
E. G. Godfree & F. R. Whitelaw
per
Lawrence Langner
Attorney.

UNITED STATES PATENT OFFICE.

ERNEST GRAHAM GODFREE AND FRANCIS REGINALD WHITELAW, OF SANDRINGHAM, NEAR MELBOURNE, VICTORIA, AUSTRALIA.

ADJUSTABLE WATER SPRINKLER OR SPRAYER.

1,034,613.

Specification of Letters Patent. Patented Aug. 6, 1912.

Application filed March 13, 1911. Serial No. 614,266.

*To all whom it may concern:*

Be it known that we, ERNEST GRAHAM GODFREE and FRANCIS REGINALD WHITELAW, subjects or citizens of Australia, residing at "Keighley," Sandringham Road, Sandringham, near Melbourne, Victoria, Australia, have invented certain new and useful Improvements in Adjustable Water Sprinklers or Sprayers, of which the following is a specification.

Our invention relates to an improved adjustable water sprinkler or sprayer which may be easily and readily attached to hose, pipes and the like for the purpose of lawn sprinkling or may be utilized for the spraying of liquids for disinfecting or similar purposes.

The object of our invention is to provide such an article which is easily adjustable to the end of any hose or the like and at the same time by a simple means the fluid being sprinkled or sprayed may be delivered in as fine a spray as is possible or by simple revolutions or a reversion of a double ended cone or spreader, the spray may be delivered in any density, or in a solid body, whichever may be desired.

Our invention will be effective under either high or low pressure. This is a great consideration when the water pressure is low, as the majority of other sprinklers are almost useless when such is the case. Means are also provided to act as a guard against the damaging of the sprayer or sprinkler when either accidentally or purposely dropped.

The invention which may be made in either brass or gun metal or any other desirable metal consists essentially of a director or cone shaped nozzle, through the center of which, from about half way down, is passed a screw threaded suspender rod or stem. The suspender rod is attached to or formed integral with a winged grid held or secured in any suitable manner within the director nozzle. This screwed suspender rod is carried a short distance beyond the director or nozzle and has screwed upon it a double ended cone or spreader. The liquid after passing through the director strikes the spreader and is so spread as to form a spray. This spreader works up and down the suspender rod and is in this way capable of adjustment to form either a very
fine spray or a spray of varying density
according to requirements. To use the nozzle as an ordinary squirt the spreader may be removed from the suspender rod.

The double ended cone is formed of sides and a top, set at different angles. The liquid after passing through the nozzle, strikes the sloping sides of the double ended cone or spreader and is so delivered in a spray. At the point where the two angles of the double ended cone meet, that is, the junction of its top and bottom sides, is formed an annular groove. The object of this annular groove is to form a perfect spray.

In order to prevent any damage to the sprayer or sprinkler by accidental dropping, we form at the top of the sprinkler and integral therewith, a disk or flange with a milled edge. This also serves for the purpose of unscrewing the invention from the hose or pipe. The inside portion of the director, beneath the suspender rod, or stem, is made screw threaded, for the purpose of attachment to the hose. But in order that our invention and its working may be thoroughly understood, we will now describe the same by the aid of the accompanying drawings, which we desire to be taken as part of this specification and read in conjunction therewith.

Figure 1 shows a side view of our invention, Fig. 2 is a sectional view of the same, while Fig. 3 is a cross sectional view taken on the line 3—3 of Fig. 1.

Similar letters of reference are used in the various views to illustrate similar parts of the invention.

A in the various figures represents a cone shaped nozzle or director, which is screwed on to the hose or pump. B is the suspender rod or stem which passes through the director nozzle and terminates in either the round or winged grid C, attached and fitted to a shoulder D within the director nozzle, at about its center. The suspender rod B is carried up and through the cone shaped nozzle for a short distance. Upon the projecting portion of the suspender rod is screwed the double ended cone portion F., the sides of which G are set at a different angle to the top H. At the point where the top and sides meet, is an annular groove I.

When it is desired to form a squirt or allow the water to come through the nozzle in a solid body, this double ended cone is unscrewed and removed from the suspender rod B.

J. represents the disk which is provided for the purpose of preventing accidental damage to the sprayer, and which has a milled edge. This disk is also used as an easy means for the removal of the invention from the hose or pump, by unscrewing of the nozzle by means of the screw threads M within the lower portion of the director below the round or winged grid C.

The method of using our invention is as follows:—The director or nozzle A is connected to the hose by means of the screw thread and the double ended cone or spreader F is screwed upon the suspender rod B. The tap is then turned on and the water or liquid flows through the director or nozzle and upon its exit strikes the sides G of the double ended cone or spreader. To regulate the density of the spray the spreader or double ended cone F may be screwed either up or down the suspender rod B. If the spreader or double ended cone be taken off and reversed upon the suspender rod a spray of wide radius is obtained. The double ended cone or spreader is not screw threaded as indicated at K, its entire length. This allows a clear and smooth passage of the water over the suspender rod and spreader when latter is screwed closely down.

A removable pin L or the like may be passed through a hole in the upper end of the suspender rod B to prevent possible loss of the spreader or deflecting member F.

Claims:

1. An adjustable sprayer and sprinkler device comprising in combination a nozzle portion, a reversible deflecting member in the form of two conical portions of different lengths united at their bases, a groove between said conical portions, a suspender for said deflecting member, an aperture in said deflecting member whereby it may be arranged upon said suspender, a recess forming part of said aperture in the end of the longer portion of said deflector, and a wide flange projecting outwardly from the upper end of said nozzle for such a distance as to protect the device from damage should it be dropped.

2. An adjustable sprayer and sprinkler device comprising in combination a nozzle portion, a reversible deflecting member in the form of two conical portions of different lengths united at their bases, a groove between said conical portions, a suspender for said deflecting member, an aperture in said deflecting member whereby it may be arranged upon said suspender, a recess forming part of said aperture in the end of the longer portion of said deflector, a wide flange projecting outwardly from the upper end of said nozzle for such a distance as to protect the device from damage should it be dropped, and a milled edge upon said flange whereby to facilitate the fitting of the device upon a hose or its removal therefrom.

3. An adjustable sprayer and sprinkler device comprising in combination a nozzle portion, a reversible deflecting member in the form of two conical portions of different lengths united at their bases, a groove between said conical portions, a suspender for said deflecting member, an aperture in said deflecting member whereby it may be arranged upon said suspender, a recess forming part of said aperture in the end of the longer portion of said deflector, said suspender having a hole through its outer end adapted to receive a removable locking member to prevent accidental loss of the deflecting member, and a wide flange projecting outwardly from the upper end of said nozzle for such a distance as to protect the device from damage should it be dropped.

4. In an adjustable sprinkler and sprayer a reversible deflecting member in the form of two truncated cones united at their bases and having an annular groove extending around said bases and means to adjust the position of said deflector.

In witness whereof we have hereunto set our hands in the presence of two subscribing witnesses.

Dated 23rd January 1911.

ERNEST GRAHAM GODFREE.
FRANCIS REGINALD WHITELAW.

Witnesses:
JOHN C. BURTON,
JOHN F. JEWELL.